(12) United States Patent
Nowshadi

(10) Patent No.: US 7,474,670 B2
(45) Date of Patent: Jan. 6, 2009

(54) METHOD AND SYSTEM FOR ALLOCATING BANDWIDTH

(75) Inventor: Farshid Nowshadi, Beds (GB)

(73) Assignee: Brooktree Broadband Holding, Inc., Newport Beach, CA (US)

( * ) Notice: Subject to any disclaimer, the term of this patent is extended or adjusted under 35 U.S.C. 154(b) by 901 days.

(21) Appl. No.: 10/614,338

(22) Filed: Jul. 8, 2003

(65) Prior Publication Data
US 2004/0054857 A1    Mar. 18, 2004

Related U.S. Application Data

(60) Provisional application No. 60/393,742, filed on Jul. 8, 2002.

(51) Int. Cl.
*H04J 3/02* (2006.01)
(52) U.S. Cl. ............. 370/462; 370/235.1; 370/232
(58) Field of Classification Search ........ 370/468, 370/232, 235, 235.1, 412, 230, 230.1, 32, 370/2, 442, 461, 462; 710/56
See application file for complete search history.

(56) References Cited

U.S. PATENT DOCUMENTS

| | | | | | |
|---|---|---|---|---|---|
| 5,274,644 | A | * | 12/1993 | Berger et al. | 370/230 |
| 5,596,576 | A | * | 1/1997 | Milito | 370/450 |
| 5,793,747 | A | * | 8/1998 | Kline | 370/230 |
| 5,805,595 | A | * | 9/1998 | Sharper et al. | 370/442 |
| 6,052,379 | A | * | 4/2000 | Iverson et al. | 370/442 |
| 6,125,396 | A | * | 9/2000 | Lowe | 709/234 |
| 6,157,978 | A | * | 12/2000 | Ng et al. | 710/240 |
| 6,167,050 | A | * | 12/2000 | Chung | 370/235.1 |

(Continued)

FOREIGN PATENT DOCUMENTS

EP    0 772 324 A2    5/1997

(Continued)

OTHER PUBLICATIONS

Abhay K. Parekh, Robert G. Gallager, "A generalized processor sharing approach to flow control in integrated services networks: the single-node case," IEEE/ACM Transactions on Networking (TON), v.1 n.3, p. 344-357, Jun. 1993.*

(Continued)

*Primary Examiner*—Hassan Kizou
*Assistant Examiner*—Emmanuel Maglo
(74) *Attorney, Agent, or Firm*—Thomas, Kayden, Horstemeyer & Risley LLP

(57) ABSTRACT

The present invention is directed to methods and systems for allocating bandwidth (or other shared resource) among multiple masters. According to an aspect of the present invention, an arbiter assigns a bucket to each CPU (or other device) where each bucket holds the credits for that CPU. Each bucket has a predetermined fill rate and a drain rate. Depending on the priority given to a particular CPU, the corresponding bucket will drain (or fill) at a particular rate. For example, CPUs with a higher priority will drain at a slower rate. For each clock tick (or other period of time) that a CPU is stalled, a number of credits is accrued. The bucket with the highest number of credits has priority and will be given access to the shared resource (e.g., DRAM, SDRAM, SRAM, EPROM, etc.).

24 Claims, 13 Drawing Sheets

U.S. PATENT DOCUMENTS

| | | | |
|---|---|---|---|
| 6,185,641 B1 * | 2/2001 | Dunnihoo | 710/56 |
| 6,351,783 B1 * | 2/2002 | Garney et al. | 710/107 |
| 6,542,467 B2 | 4/2003 | Umayabashi | |
| 6,546,014 B1 | 4/2003 | Kramer et al. | |
| 6,570,847 B1 * | 5/2003 | Hosein | 370/230.1 |
| 6,578,082 B1 * | 6/2003 | Ho et al. | 709/233 |
| 6,587,436 B1 | 7/2003 | Vu et al. | |
| 6,628,609 B2 | 9/2003 | Chapman et al. | |
| 6,628,670 B1 | 9/2003 | Galand et al. | |
| 6,631,118 B1 | 10/2003 | Jones | |
| 6,631,134 B1 | 10/2003 | Zadikian et al. | |
| 6,639,919 B2 | 10/2003 | Kroninger et al. | |
| 6,657,960 B1 * | 12/2003 | Jeffries et al. | 370/230.1 |
| 6,842,783 B1 * | 1/2005 | Boivie et al. | 709/225 |
| 7,006,521 B2 * | 2/2006 | Nguyen et al. | 370/462 |
| 7,107,376 B2 * | 9/2006 | Asano et al. | 710/117 |
| 7,236,458 B2 * | 6/2007 | Lee et al. | 370/230 |
| 7,430,173 B2 * | 9/2008 | St. Denis et al. | 370/235.1 |

FOREIGN PATENT DOCUMENTS

WO   WO 02/21773 A2   3/2002

OTHER PUBLICATIONS

"Specification of Guaranteed Quality of Service", Request for Comments: 2212 (RFC 2212), Internet Engineering Task Force, Sep. 1997.*

Rundberg, Peter, "Memory Bandwidth Explained," Temple of Technology, Mar. 7, 2001.*

Minerd, Timothy, "Time Division Multiplexed Bus for Machine Control," IEEE Industry Applications Magazine, May/Jun. 1997.*

Shah, Niraj, "Understanding Network Processors," Version 1.0, Sep. 4, 2001.*

Giroux, et al., "Queuing and Scheduling, Scheduling Mechanisms", Quality of Service in ATM Networks: State-of-the-Art Traffic Management, p. 96-109, 1999.

Tannenbaum, "Computer Networks, The Leaky Bucket Algorithm", Computer Networks, North Holland, Amsterdam, NL, p. 380-384, 1996.

* cited by examiner

METHOD AND SYSTEM FOR ALLOCATING BANDWIDTH

CROSS-REFERENCE TO RELATED APPLICATIONS

This patent application claims priority to U.S. Provisional Patent Application No. 60/393,742 filed Jul. 8, 2002, which is hereby incorporated by reference herein in its entirety.

FIELD OF THE INVENTION

The present invention relates generally to allocating bandwidth and, more particularly, to allocating memory bandwidth (or other shared resource) among multiple master devices.

BACKGROUND OF THE INVENTION

Many modern high performance systems have multiple processors, many of which run independently but ultimately share one large common memory pool. Each processor typically has a small amount of fast local Random Access Memory (RAM). A large memory pool including Dynamic Random Access Memory (DRAM) (as well as Synchronous Dynamic Random Access Memory (SDRAM)) is usually shared amongst most or all the processors within a system.

DRAM bandwidth is very limited. Further, the access time of DRAMs is very slow, much slower than the bandwidth required for a single Central Processing Unit (CPU) let alone two or more CPUs. In large systems where four or eight CPU's are all trying to access the DRAM, arbitration must be carefully managed.

Complications to any arbitration scheme include situations where not all CPUs need to have the same priority. In particular, some CPUs may be allowed a greater share of the available bandwidth. For instance, in a two CPU system, one CPU may be performing mundane functions while the other CPU may be running time critical applications. In this case, it is preferable that the CPU running critical applications is allowed all the bandwidth it requires and only the bandwidth left over is given to the less important CPU.

Typical solutions to this problem have involved assigning a static priority to each CPU. For example, an arbiter will grant DRAM access to whichever requesting CPU has the highest priority.

FIG. 1 is an example of a system implementing a static priority scheme. As shown in FIG. 1, CPU A has the highest priority and the CPU C has the lowest priority. If all CPU's request access to DRAM (or SDRAM) at the same time, CPU A will be given access. If only CPU B and CPU C request access to SDRAM, then access is given to CPU B. CPU C only is given access if both CPU A or B do not require access to the shared resource.

Other arbitration schemes may include round robin, where priority is rotated, or a fixed tiered priority scheme. FIG. 2 is an example of a system implementing a round robin priority scheme. In a system of a plurality of CPUs (e.g., 3 CPUs) using a round robin priority scheme, whenever a CPU has been granted access to a bus, the priority associated with that CPU is reset to the lowest priority and the CPU which previously has the second highest priority will be promoted to the highest priority. In other words, if a CPU is granted access to the bus, that CPU goes to the back of the queue. Thus, priorities will change when a CPU has been granted access to the bus, with the granted CPU being assigned the lowest priority and the others being promoted up the priority ladder.

FIG. 3 is an example of a system implementing a fixed tiered priority scheme. In a fixed tiered priority scheme, CPU A and CPU B round robin between themselves but have priority over CPU C and CPU D which round robin between themselves.

However, current systems implementing fixed priority schemes have several drawbacks. As the number of CPUs in a system increases it has an unfortunate effect of ruthlessly punishing low priority CPUs. For example, if a system has four CPUs, it becomes increasingly unlikely that all of the three top highest CPUs are not requesting access to the SDRAM and thus giving the lowest priority CPU access. In addition, although a CPU may be assigned a low priority, the CPU may still have a maximum latency requirement. For instance, a CPU in a system may have the task of servicing a Universal Asynchronous Receiver Transmitter (UART). Although the UART may not need prompt servicing (due to internal First In First Out (FIFO) buffering), it may require servicing eventually otherwise the FIFO will fill up and data will be lost.

Therefore, there is a need for a more efficient method and system for efficiently allocating bandwidth (e.g., memory bandwidth) as well as other shared resources.

SUMMARY OF THE INVENTION

Aspects of the present invention overcome the problems noted above, and realize additional advantages. In one exemplary embodiment, an arbiter assigns a bucket to each CPU where each bucket holds the credits for that CPU. Each bucket has a predetermined fill rate and a predetermined drain rate. Depending on the priority given to a particular CPU, the corresponding bucket will drain (or fill) at a particular rate. For example, CPUs with a higher priority will drain at a slower rate. For each clock tick (or other period of time) that a CPU is stalled, a number of credits may be accrued. The bucket with the highest number of credits may be granted priority and given access to the DRAM (or other shared resource).

According to one particular exemplary embodiment, a method for allocating a shared resource among a plurality of devices comprising the steps of associating a bucket to each one of the plurality of devices wherein the plurality of devices share a shared resource; assigning a fill rate to each bucket where each bucket accrues a predetermined number of credits for each time period the associated device is stalled; assigning a drain rate to each bucket where each bucket drains a predetermined number of credits for each time period the associated device is granted access to the shared resource; comparing each bucket to determine a grant bucket having the most number of credits at a specific time; and granting access to the shared resource to the device associated with the grant bucket.

In accordance with other aspects of this particular exemplary embodiment of the present invention, the shared resource comprises a memory bandwidth; memory bandwidth is associated with one or more of DRAM, SDRAM, SRAM and EPROM; the shared resource comprises a bus connected to at least one peripheral device including one or more of TDM, UART, USB, and PCI; the plurality of devices comprise processing units; the plurality of devices comprise at least a combination of a DMA controller, a network processor and a protocol processor; each fill rate is different, each fill rate indicating access priority assigned to the associated device; each drain rate is different, each drain rate indicating access priority assigned to the associated device; the method further comprises the step of determining a maximum latency when a bucket reaches a maximum number of credits; the method further comprises the step of granting immediate access to the shared resource to the device associated with bucket reaching the maximum number of credits when the maximum latency is determined; the method further comprises the step of dynamically adjusting one or more of the fill rate and drain rate associated with one or more buckets for load balancing one or more of the plurality of devices; the method further comprises the step of determining an amount of bandwidth each device has used; the method further comprises the step of charging an entity according to the amount of bandwidth used.

According to another particular exemplary embodiment, a system for allocating a shared resource among a plurality of devices comprises an association module for associating a bucket to each one of the plurality of devices wherein the plurality of devices share a shared resource; a fill rate module for assigning a fill rate to each bucket where each bucket accrues a predetermined number of credits for each time period the associated device is stalled; a drain rate module for assigning a drain rate to each bucket where each bucket drains a predetermined number of credits for each time period the associated device is granted access to the shared resource; a grant determination module for comparing each bucket to determine a grant bucket having the most number of credits at a specific time; and a grant access module for granting access to the shared resource to the device associated with the grant bucket.

The accompanying drawings, which are incorporated in and constitute a part of this specification, illustrate various embodiments of the invention and, together with the description, serve to explain the principles of the invention.

BRIEF DESCRIPTION OF THE DRAWINGS

The present invention can be understood more completely by reading the following Detailed Description of the Invention, in conjunction with the accompanying drawings, in which.

DETAILED DESCRIPTION OF THE INVENTION

The following description is intended to convey a thorough understanding of the invention by providing a number of specific embodiments and details related to bandwidth allocation, such as memory bandwidth allocation. It is understood, however, that the invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention involves enabling an arbiter to assign a bucket to each CPU where each bucket holds the credits for that CPU. An arbitration process will select a CPU to access the DRAM (or other shared resource). In particular, the CPU with the highest number credits in its bucket will be granted access to the DRAM (or other shared resource).

Figure 1:
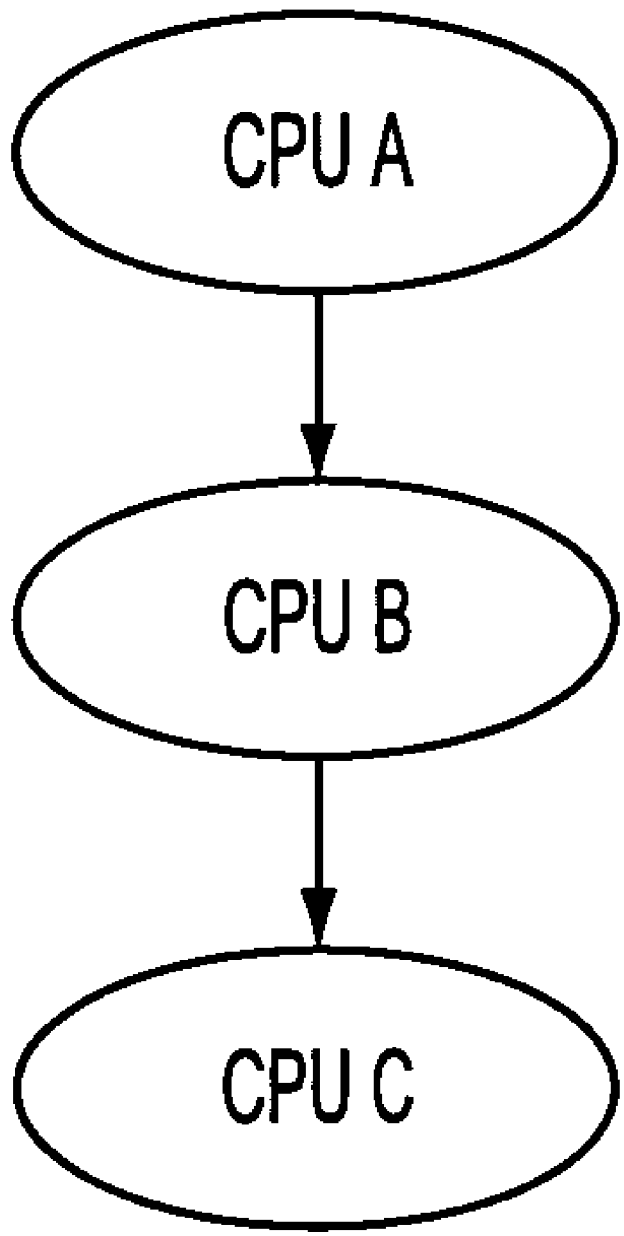
FIG. 1 is an example of a system implementing static priority.
Figure 2:
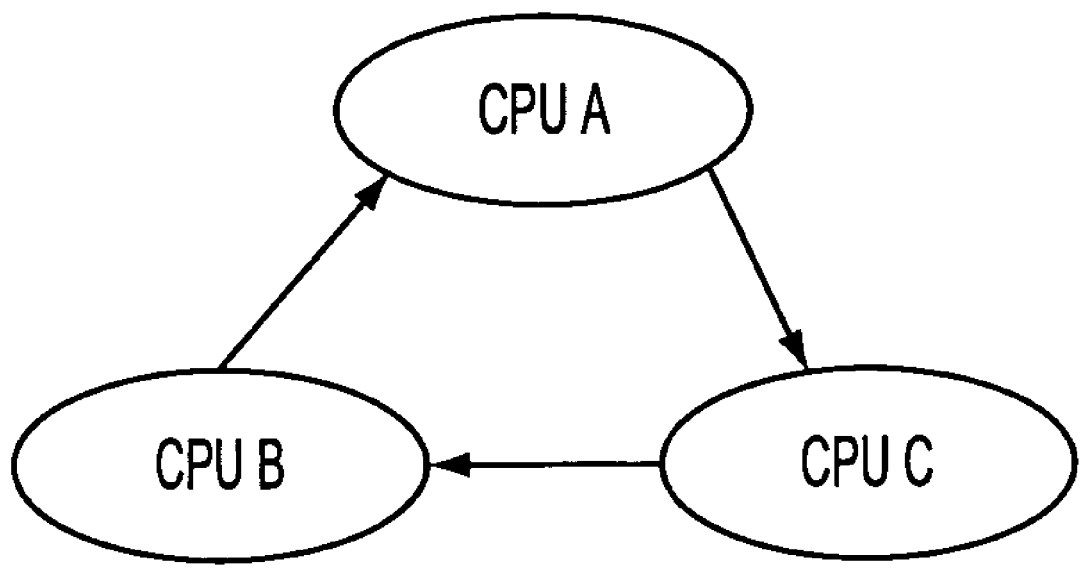
FIG. 2 is an example of a system implementing round robin priority.
Figure 3:
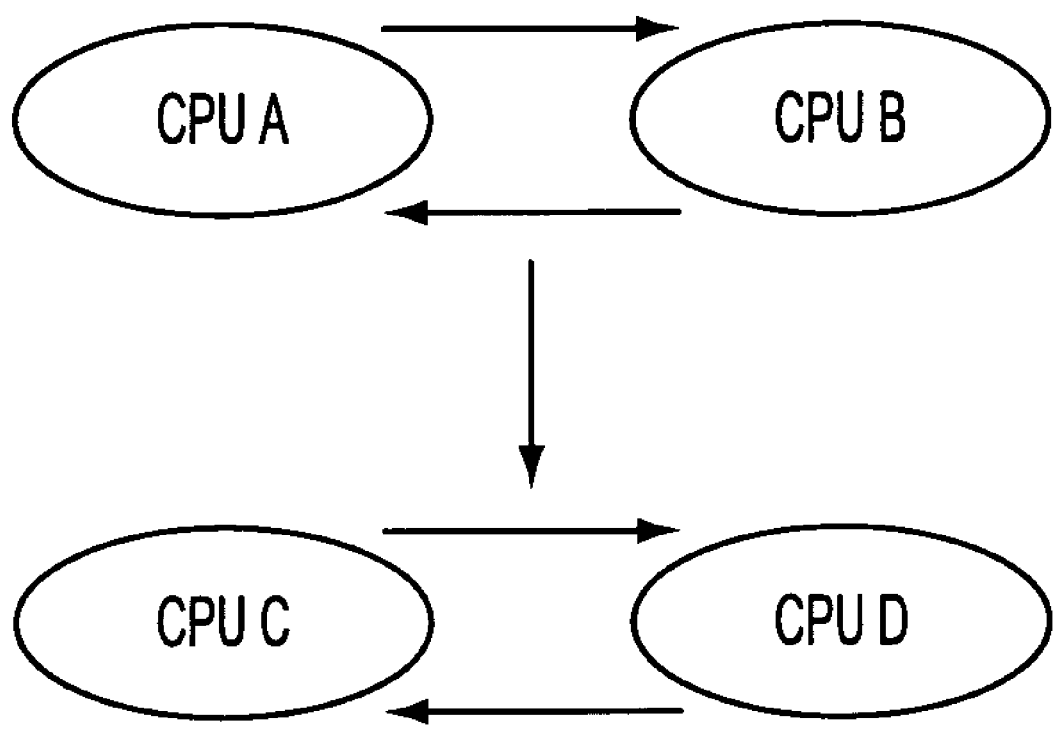
FIG. 3 is an example of a system implementing a fixed tiered priority.
Figure 4:
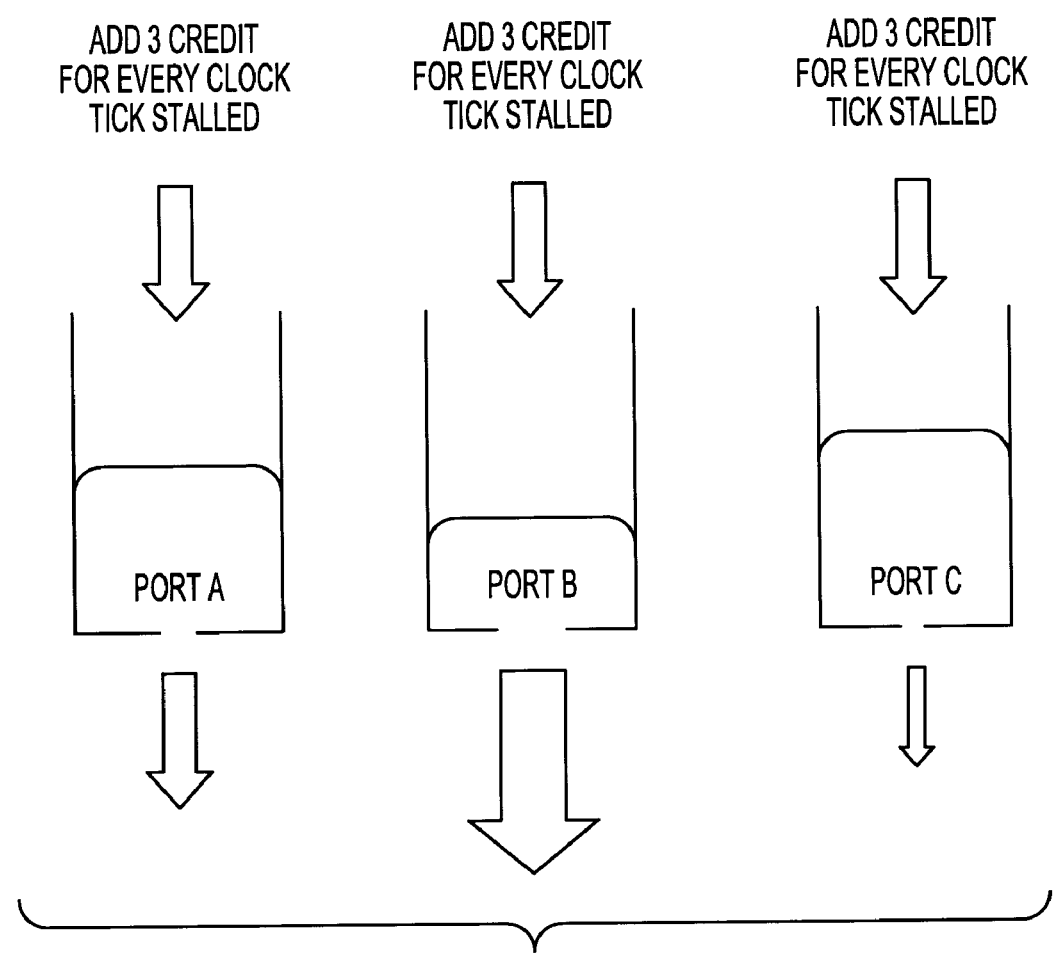
FIG. 4 is an example of a leaky bucket scheme in accordance with an embodiment of the present invention.

FIG. 4 is an example of a leaky bucket scheme in accordance with an embodiment of the present invention. In this example, each bucket may hold up to a predetermined number of credits, e.g., 128 credits. Other maximum credit values (fixed or variable) may be implemented as well.

At the start of day (or other predetermined start period), all the buckets start empty. If a first CPU tries to access the DRAM (or other shared resource) but is stalled due to a second CPU being given prior access, then the stalling first CPU starts to accumulate a predetermined number of credits for every clock tick (or other predetermined time period) the first CPU is stalled. According to an embodiment of the present invention, a predetermined number of credits (e.g., 3 credits) may be accrued for every clock tick (or other time period) stalled. The predetermined number of credits may be fixed or a variable. The longer a CPU is stalled, the greater number of credits the CPU will accumulate. If a bucket overflows, a maximum latency has been reached and the arbiter may take an appropriate action. For example, the CPU may be given priority and given immediate access. Other actions may include pushing the CPU ahead of consideration, enabling a queue jump, sending an acknowledgement warning or other message as well as other responses. Another action may include dynamically changing the priority on ports to ease an overload condition.

According to another embodiment of the present invention, each bucket may include a hole that drains at a predetermined drain rate. The credits may drain through the hole every time that CPU has been granted access to the DRAM (or other shared resource). For example, for every clock tick (or other time period) the CPU has access to the DRAM (or other shared resource), its credits are drained through the drain hole at a particular drain rate for that CPU. The more clock ticks the CPU has access to the DRAM (or other shared resource), the more credits will drain away. Credits in a bucket remain unchanged if the CPU is neither stalled nor has access to the DRAM (or other shared resource).

According to an embodiment of the present invention, most or all buckets may fill at the same or substantially similar rate (e.g., 3 credits for every clock tick stalled). However, the drain rate (e.g., size of the hole) may be programmed individually for each CPU. For example, a CPU with a high priority may have a small drain hole while a CPU with a lower priority may have a larger drain hole. Therefore, once a CPU has been granted access to the DRAMs (or other shared resource), low priority CPUs will drain more rapidly whereas high priority CPUs will drain more slowly keeping their credit value intact.

According to another embodiment of the present invention, each CPU bucket may fill at an individual rate while each CPU may drain at the same (or substantially similar) rate. In this example, a CPU with a high priority will fill at a more rapid rate than a CPU with a lower priority. In yet another example, both fill and drain rates may vary for each CPU. For example, a CPU with a high priority may drain at a slower rate and fill at a faster rate. Other variations may be implemented.

In accordance with an embodiment of the present invention, a port with the highest credit wins the arbitration and gains access to the DRAM (or other shared resource). As shown in FIG. 4, Port A, Port B and Port C may fill at a fill rate of 3 credits for every clock tick stalled. However, in this example, Port C is assigned a slower drain rate than Port A and Port B. Thus, Port C is granted higher priority. In addition, Port A has a slower drain rate than Port B. In the example of FIG. 4, Port C may be granted access to the bus because Port C has the most number of credits.

Figure 5:
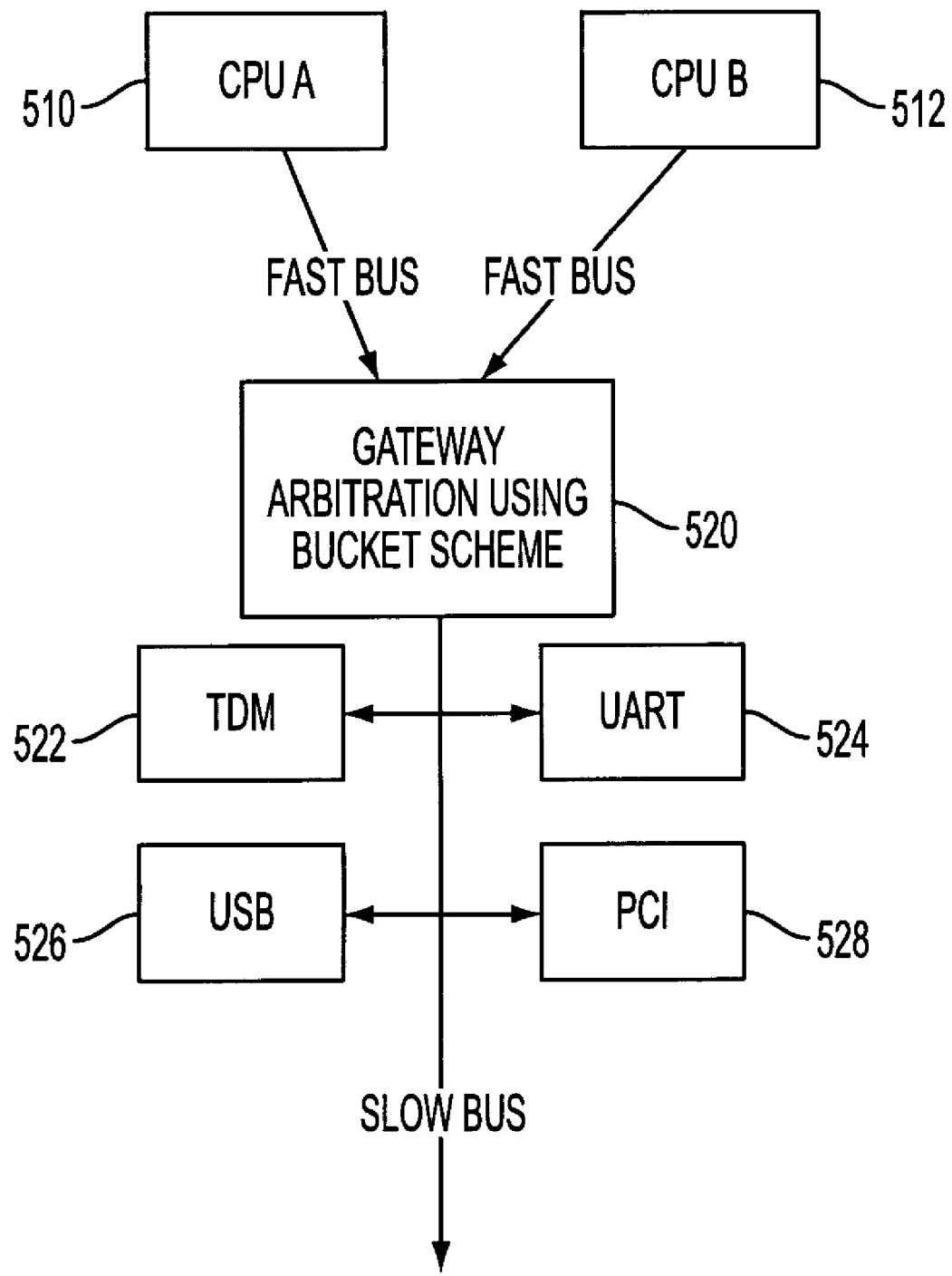
FIG. 5 is an example of a leaky bucket scheme in accordance with an embodiment of the present invention.

FIG. 5 is an example of a leaky bucket scheme in accordance with an embodiment of the present invention. While the present invention has been described above in exemplary embodiments in terms of allocating memory bandwidth, the aspects of the present invention may be further applied to allocating any shared resource to multiple masters. According to an embodiment of the present invention, bandwidth may be allocated from a first device (e.g., a slow bus) to a plurality of devices (e.g., two or more fast CPUs). The first device (e.g., a slow bus) may be any memory type (e.g., SDRAM, SRAM, Erasable Programmable Read Only Memory (EPROM), or other shared resource) external or internal. In another example, the first device may be access to a different type of shared resource, such as a slow internal bus connected to peripheral devices. As shown in FIG. 5, CPU A 510 and CPU B 512 may try to gain access to UART 524 (or other device, e.g., Time Division Multiplexing (TDM) 522, Universal Serial Bus (USB) 526, Peripheral Component Interconnect (PCI) 528, etc.), as determined by a gateway arbitration using a bucket scheme of an embodiment of the present invention, as shown by 520. In a processor (e.g., Helium 500™ processor, as discussed below), the scheme of an embodiment of the present invention may be used to share the SDRAM bus, according to an example of the present invention. However, the shared bus may be any type of bus (or other resource). Further, the shared bus does not necessarily have to be a particularly slow bus. When two or more devices are attempting to access a shared resource, the bucket scheme of an embodiment of the present invention may be used.

The credit levels of each CPU bucket provides valuable insight into the state of each CPU (or other device). An embodiment of the present invention may be used for applications, other than arbitration. Other applications may include load balancing, diagnostics, and accounting, for example.

For load balancing, the drain rate (e.g., or size of hole) in each bucket may be changed dynamically to balance the load on some or all CPUs (or other devices). For diagnostics, information including average credit levels, maximum and minimum credit levels may give an indication of the efficiency of a system. Also, useful information may be gained from knowing that a maximum latency has been reached. In particular, this information may be indicative of a sustained and prolonged stalling on a particular port brought about usually when a system is overloaded. In a situation where there is such a large amount of traffic so that the SDRAM bandwidth (or other shared resource) is substantially swamped, the maximum latencies will start to be reached. This feedback may be useful for software engineers (or other users) who can alter programs to alleviate the stalling problem by reducing and/or redistributing the load on the SDRAMs (or other shared resource). For example, the software may decide to throttle back on the amount of data being transmitted thereby reducing the load on the SDRAMs (or other shared resource). For accounting, statistics on how much bandwidth each CPU has used may be used to ultimately charge customers according to how much of the system resources (e.g., DRAM, SDRAM, etc.) they have used.

Figure 6:
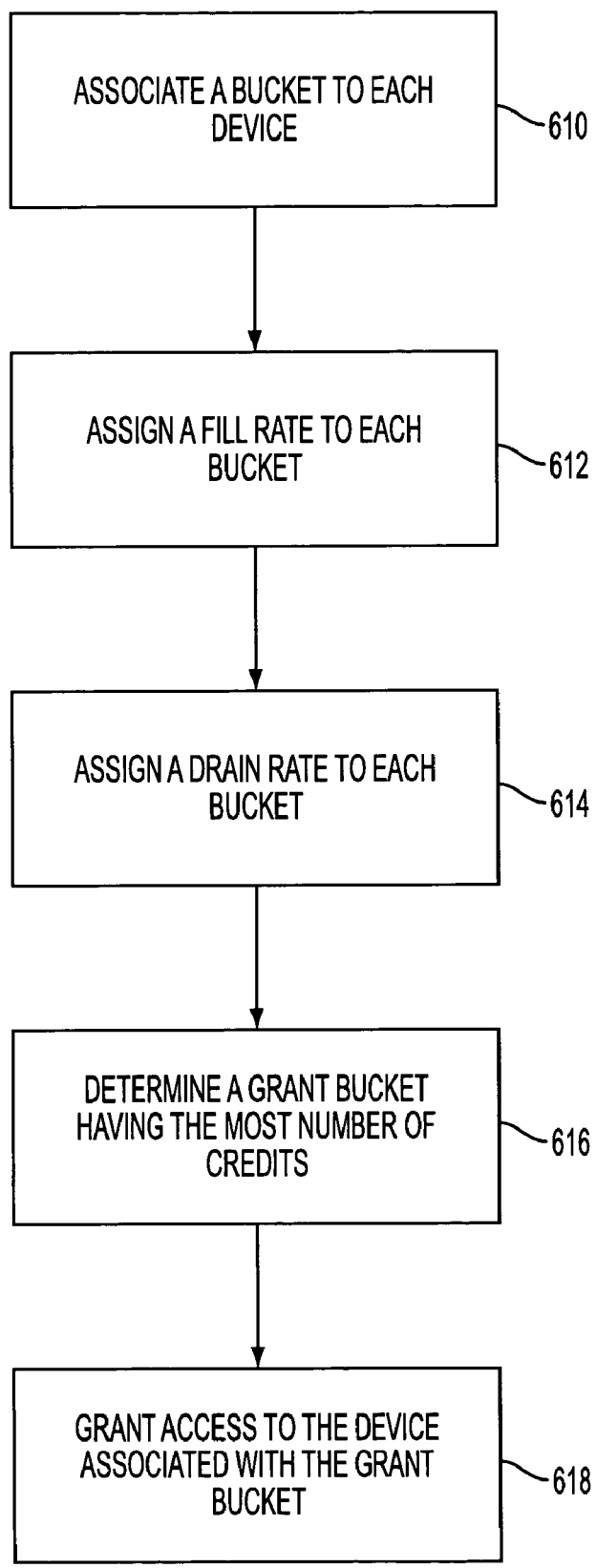
FIG. 6 is an exemplary flowchart illustrating a method for allocating a shared resource in accordance with an embodiment of the present invention.

FIG. 6 is an exemplary flowchart illustrating a method for allocating a shared resource in accordance with an embodiment of the present invention. At step 610, a bucket may be associated to each one of the plurality of devices wherein the plurality of devices share a shared resource. At step 612, a fill rate may be assigned to each bucket where each bucket accrues a predetermined number of credits for each time period the associated device is stalled. At step 614, a drain rate may be assigned to each bucket where each bucket drains a predetermined number of credits for each time period the associated device is granted access to the shared resource. At step 616, each bucket may be compared to determine a grant bucket having the most number of credits at a specific time. At step 618, access to the shared resource may be granted to the device associated with the grant bucket.

Figure 7:
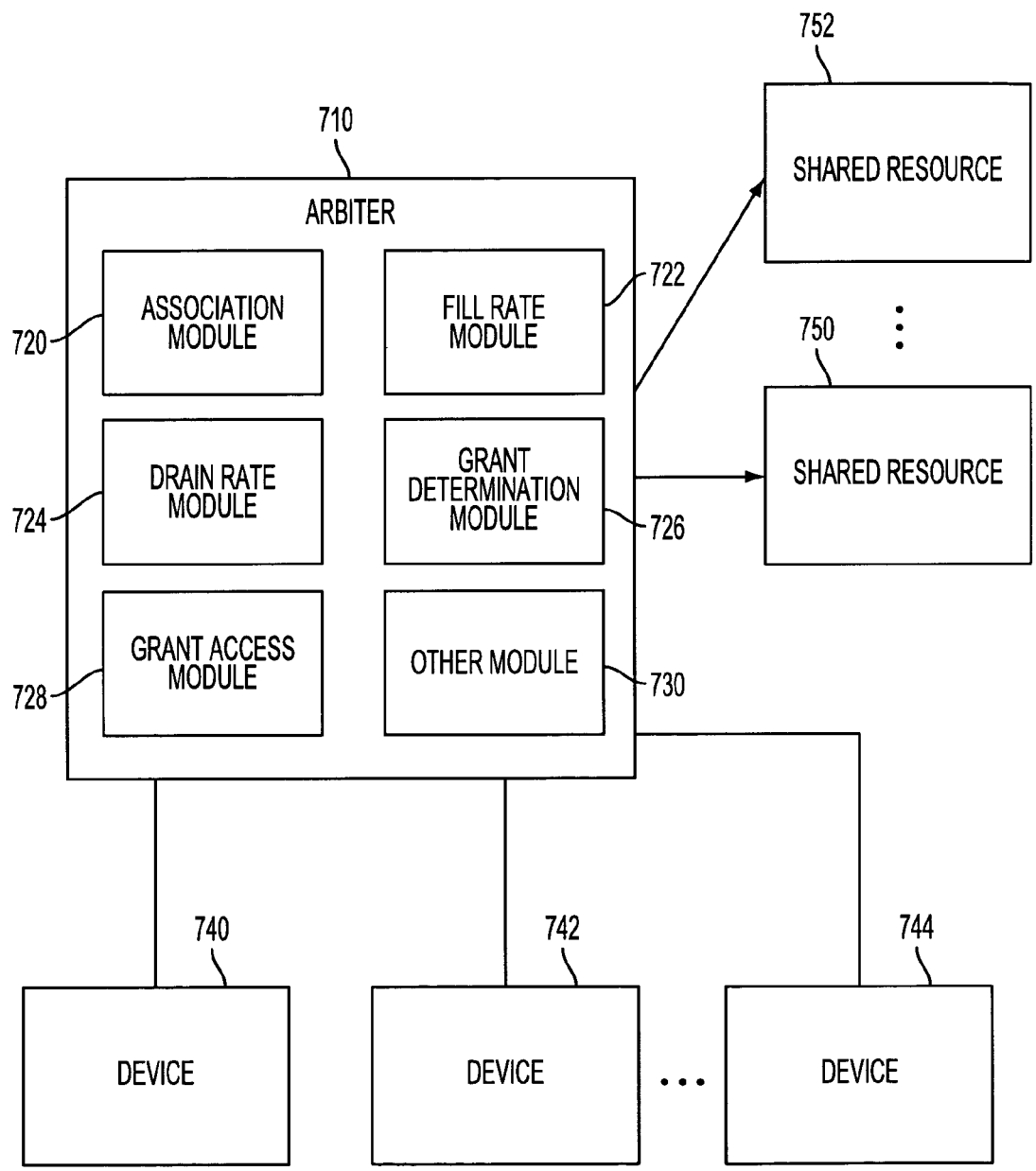
FIG. 7 is an exemplary diagram illustrating a system for allocating a shared resource in accordance with an embodiment of the present invention.

FIG. 7 is an exemplary diagram illustrating a system for allocating a shared resource in accordance with an embodiment of the present invention. A system for allocating a shared resource among a plurality of devices may include an Arbiter 710 with an Association Module 720, a Fill Rate Module 722, a Drain Rate Module 724, a Grant Determination Module 726, a Grant Access Module 728, and Other Module 730. Association Module 720 may associate a bucket to each one of the plurality of devices 740, 742 and 744 wherein the plurality of devices share one or more shared resource, as shown by 750 and 752. Fill Rate Module 722 may assign a fill rate to each bucket where each bucket accrues a predetermined number of credits for each time period the associated device is stalled. A Drain Rate Module 724 may assign a drain rate to each bucket where each bucket drains a predetermined number of credits for each time period the associated device is granted access to the shared resource. A Grant Determination Module 726 may compare each bucket to determine a grant bucket having the most number of credits at a specific time. A Grant Access Module 728 may granting access to the shared resource (e.g., 750, 752) to the device associated with the grant bucket. Other Module 730 may provide additional functionality associated with allocating a shared resource.

GlobespanVirata® Corporation's Helium™ 500 communications processor (Helium 500 CP) is a high performance Asynchronous Transfer Mode (ATM) and Internet Protocol (IP) processor. Helium 500 CP offers an extended range of Input/Output (I/O) options and features, providing great flexibility as well as an extended choice of operating systems for an application developer. Helium 500 CP uses a dual processor architecture to provide an efficient and flexible solution for a range of applications. The main CPU, the Protocol Processor (PP), runs the operating system and application software. Time critical tasks, such as servicing of I/O ports, ATM switching and ATM traffic shaping are handled by a second processor, the Network Processor (NP). This dual processor design frees the main CPU from constant interrupts, enabling very efficient use of the processor and memory bandwidth for application processing tasks. The Network Processor itself is made more efficient by the inclusion of independent Direct Memory Access (DMA) controller blocks in each of the high-performance I/O blocks. Use of these reduces the NP processing to the start and end of a packet only.

Figure 8:
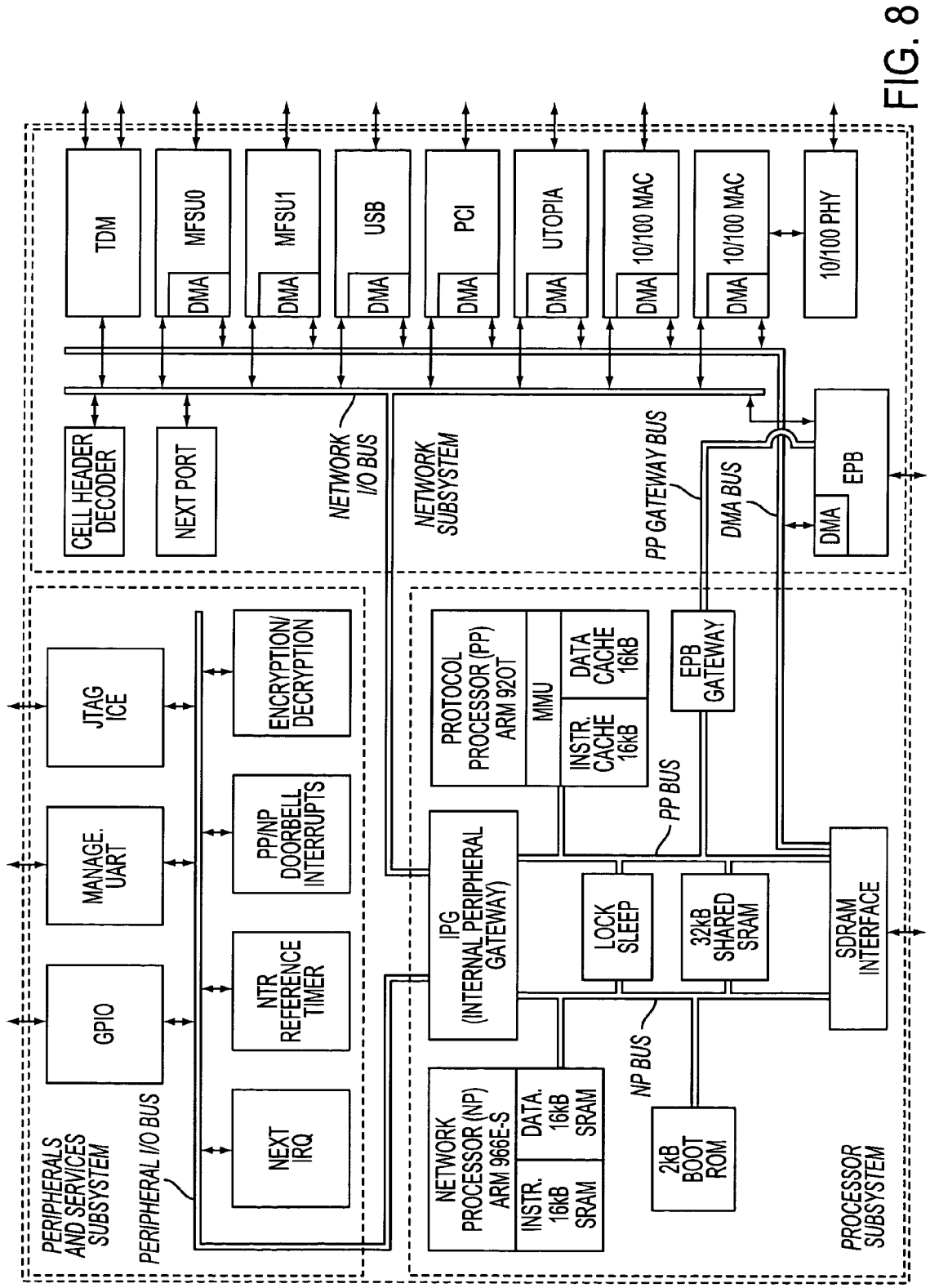
FIG. 8 is a schematic diagram of a hardware architecture in which the inventive aspects of the present invention may be incorporated.

FIG. 8 is a schematic diagram of a hardware architecture in which the inventive aspects of the present invention may be incorporated. In particular, FIG. 8 illustrates a block diagram of Helium 500 CP incorporating the inventive aspects discussed above, in accordance with the present invention. Helium 500 CP has at least three functional subsystems, which include a Processor subsystem, a Network subsystem and a Peripherals and Services subsystem. The Processor subsystem comprises a dual Advanced Reduced Instruction Set Computing (RISC) Machine (ARM®) processor, shared memory and a common Static Random Access Memory (SRAM) interface block. The Network subsystem provides high performance I/O connections and associated services. The Peripherals and Services subsystem provides a programmable General Purpose I/O (GPIO) connection, management and debug connections and additional services for the processors, including hardware encryption/decryption block for optimal network performance. This block also includes the system clocks and timers. These functional sub-systems are linked by high-performance buses, all of which operate at the same clock speed as the processors.

For its main CPU, the Helium 500 CP uses the powerful ARM920™ processor running at 166 or 133 MHz, depending on product variant. Large data and instruction caches and a highly efficient Synchronous Dynamic Random Access Memory (SDRAM) controller further enhance performance. In addition, the inclusion of a Memory Management Unit (MMU) allows the use of a wider choice of operating systems for application development. Applications for the Helium 500 CP can be developed using any of the ATMOS™ operating system, from GlobespanVirata® Corporation; VxWorkS™, from Wind River™, Linux™ and others. For its second processor, the Helium 500 CP uses the high-performance ARM966E-S® processor, also running at 166 or 133 MHz, depending on product variant. For maximum data transfer efficiency, the NP shares SRAM and the SDRAM controller with the PP.

The Helium 500 CP incorporates a wide range of I/O blocks, making it an ideal platform for applications requiring cell, frame and Time Division Multiplexing (TDM) connectivity. In addition to its on-board I/O capabilities, the Helium 500 CP provides expansion ports dedicated to state-of-the-art peripheral devices. Its External Peripheral Bus (EPB) supports Motorola™ or Intel™-type peripheral devices, as well as Personal Computer Memory Card International Association (PCMCIA) peripheral devices. For very high performance peripherals, the Helium 500 CP includes a Peripheral Component Interconnect (PCI) expansion bus and system controller. The PCI bus has a direct path to system memory, allowing peripherals to DMA data directly.

Each of the Network I/O blocks, except for the TDM block, includes a dedicated DMA engine. These share a dedicated DMA bus, through which they connect directly to the SDRAM controller. The DMA system allows data transfers between the I/O blocks and external SDRAM to be performed with minimal intervention from the processors.

The Helium 500 communications processor has the following key features: choice of operating system support from ATMOS™ from GlobespanVirata® Corporation, VxWorks™ from Wind River™; and Linux™; Protocol Processor (PP) as the main CPU: High-performance ARM® 9 with MMU, 16 KB data cache, 16 KB instruction cache; separate ARM® 9 Network Processor (NP) off-loads time-critical tasks from PP, 32 KB private "tightly coupled" SRAM onchip: 16 KB data, 16 KB instruction space; product variants with 166 MHz and 133 MHz processor speeds, memory systems designed to optimize throughput of data: additional 32 KB SRAM shared between the two processors, high performance SDRAM controller, shared by the two processors, operates synchronously with processors; supports up to 128 MB external DRAM; high-performance DMA systems, optimized for efficient handling of communications data: each high-bandwidth I/O block has its own dedicated DMA engine, a common full-speed 32 bit bus links the DMA engines directly to the SDRAM controller; in normal operation, the NP will initiate a DMA transfer where no further NP processing is required until the transfer has completed, functions such as checksum calculation and byte alignment can be performed while the data is being transferred, Nextport logic block determines which I/O port service request has the highest priority, removing need for any polling of I/O ports by the processor, similarly, a Next Interrupt Request (IRQ) block prioritizes outstanding IRQs without processor intervention; dual 10/100 Mb/s Ethernet Media Access Controllers (MACs); Encryption/Decryption hardware accelerator (with Internet Protocol Security (IPSec) support), supported by hardware random number generator: encrypts and decrypts data as defined in Forwarding Information Base (FIBS) BUS 81, single or triple Data Encryption Standard (DES) modes; supports Electronic Code Book (ECB), Cipher Block Chaining (CBC), Output Feedback (cryptography) (OFB)-64, incorporates Secure Hashing Algorithm according to Federal Information Processing Standard (FIPS) Publication (PUB) 180-1 (SHA-1) hardware assist function; two high-speed multi-function serial units (MFSUs), each of which is configured to operate in one of three modes: High-Level Data Link Control (HDLC) mode conforms to q.921 and International Organization for Standardization/International Electrotechnical Commission (ISO/IEC) 2209:1993, supports bus mode, V.35 and X.21 fixed links operating at up to 50 Mb/s, hardware support for 16 and 32 bit Frame Checking Sequence (FCS); I.432 Mode is in accordance with International Telecommunication Union-Telecommunications (ITU-T) I.432 interface standard at 50 Mb/s data rate; High-speed Serial Universal Asynchronous Receiver and Transmitter (UART) mode, supporting both 3-wire and 5-wire interfaces (software or hardware flow control) at 1.5 Mb/s data rate, suitable for connection to Bluetooth devices; TDM block provides two independent TDM interfaces with flexible HDLC controllers, each offering data rate up to 8 Mb/s; up to 256 programmable time-slots, up to 32 simultaneous HDLC streams, with single or multiple time-slots and programmable number of bits per slot; ability to support "quad" framer devices (carrying up to four T1/E1 channels); Universal Test and Operations Physical Interface for ATM (UTOPIA) master/slave port offers UTOPIA level 1 or 2 ports, master or slave operation, provides up to 31 ports, first 8 ports can be configured for high-speed operation; Network Timing Reference (NTR) recovery function, can also provide local network clock generation; PCI expansion bus for high-speed, flexible peripheral connection: 32 bit, 33 MHz bus, PCI master or slave operation, in-built arbiter with support for up to two peripheral devices for operation in master mode, PCI Rev 2.2 complaint; External Peripheral Bus (EPB) for co-processor or peripheral expansion: supports 8, 16 and 32 bit bus widths, offers support for i960, Motorola, Intel and PCMCIA bus formats, programmable strobes allows support for other formats; Universal Serial Bus (USB) 1.1 slave port operates at 12 Mhz; Programmable GPIO block with up to 64 I/O pins available, each configurable as input or output, allows interfacing to local device (e.g., for driving indicators or sensing switches); support for Institute of Electrical and Electronics Engineers (IEEE) 1149.1 boundary scan and ARM® In-Circuit Emulator (ICE) debugger; Compatible with GlobespanVirata Corporation Helium family of products and IP Service Operating System (ISOS) software; designed throughout for low-power operation, many operational blocks can be put into standby mode to save power.

Figure 9:
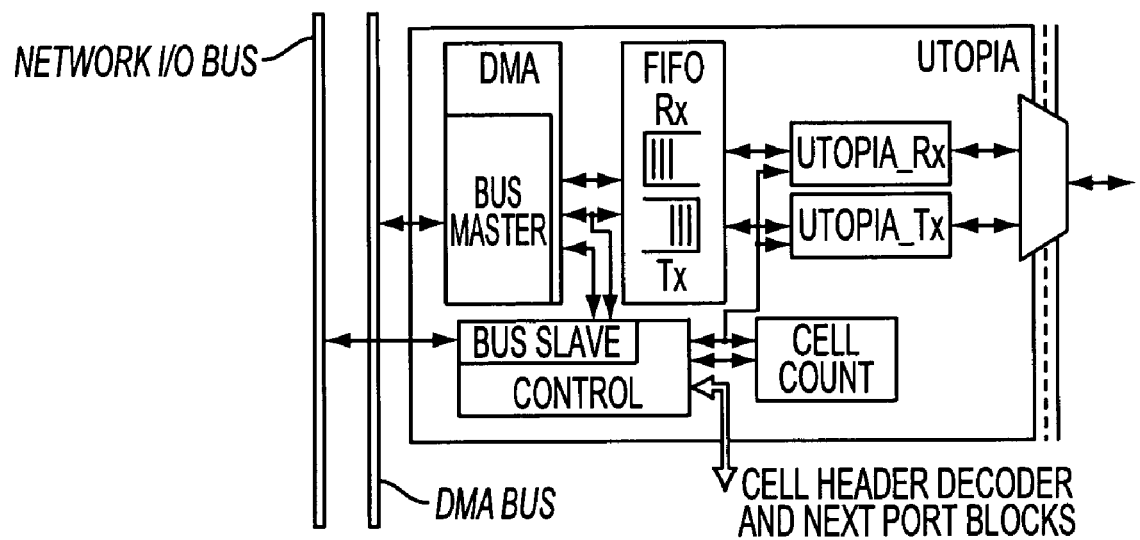
FIG. 9 is a schematic diagram of a hardware architecture in which the inventive aspects of the present invention may be incorporated.

FIG. 9 is a schematic diagram of a hardware architecture in which the inventive aspects of the present invention may be incorporated. In particular, FIG. 9 is a UTOPIA block functional overview incorporating the inventive features discussed in detail above. The Helium 500 CP provides a single UTOPIA interface which can operate in the following four modes: UTOPIA Level 2 Master (L2M) up to 31 ports; UTOPIA Level 2 Slave (L2S) single port (port number between 0 and 30); UTOPIA Level 1 Master (L1M) single port (port 0); and UTOPIA level 1 slave (L1S) single port (port 0).

As shown in FIG. 9, the main data path through the block passes (in the reverse direction) from the external connections, through the UTOPIA Rx processor, to the First In First Out (FIFO) block. The DMA engine, which forms part of the block, transfers data from the FIFO onto the DMA bus and then directly into SDRAM. The transmit data path is simply the reverse of this, passing from the FIFOs through the UTOPIA Tx processor block. In addition, the UTOPIA block control logic is connected to the Network I/O bus, and can also access the FIFOs. A cell counter unit is also provided; this tracks the number of cells transmitted and received on each port. The block provides highly-flexible support for the prioritization of some ports for high-speed operation. Separate FIFOs are provided for Transmit and Receive data. The organization of the FIFOs depends on the operating mode of the block; however each active port is always provided with at least a single cell (e.g., 13-word) buffer. The FIFO hardware provides synchronization between the different clock domains of the UTOPIA block, where this is required.

Figure 10:
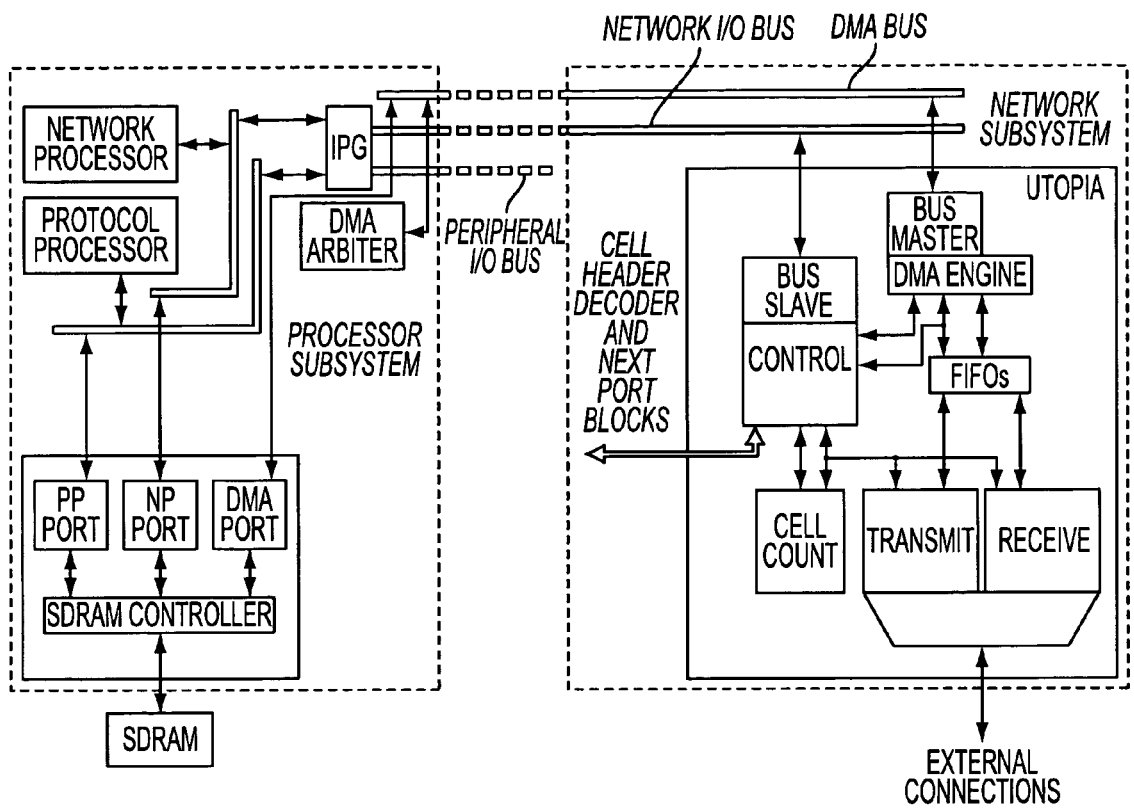
FIG. 10 is a schematic diagram of a hardware architecture in which the inventive aspects of the present invention may be incorporated.

FIG. 10 is a schematic diagram of a hardware architecture in which the inventive aspects of the present invention may be incorporated. In particular, FIG. 10 illustrates the relation of the UTOPIA block to the Helium 500 CP architecture. This diagram indicates how the UTOPIA block's DMA engine transfers data directly to external SDRAM, via the DMA bus and the SDRAM controller, without any intervention from the processors. It also indicates the direct connections between the UTOPIA block and the Next Port and Cell Header Decoder blocks of the Network subsystem.

Figure 11:
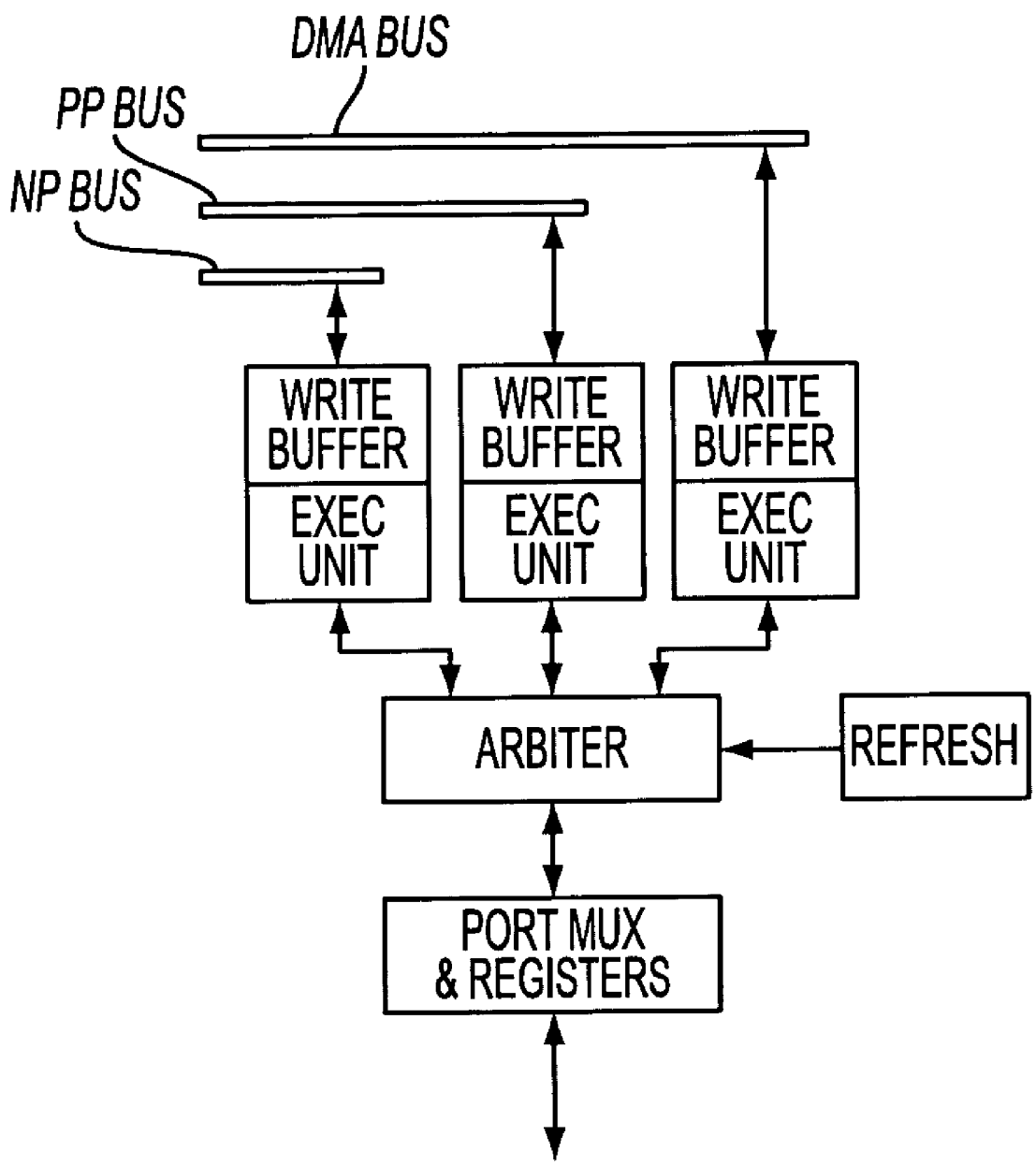
FIG. 11 is a schematic diagram of a hardware architecture in which the inventive aspects of the present invention may be incorporated.

FIG. 11 is a schematic diagram of a hardware architecture in which the inventive aspects of the present invention may be incorporated. In particular, FIG. 11 illustrates a SDRAM block diagram. The SDRAM controller provides a high-performance interface to external SDRAMs for code and data storage. It operates at the processor core clock frequency of 166 or 133 MHz, and is compatible with the Joint Electronic Device Engineering Counsel (JEDEC) standard JED2421 for interfacing to synchronous DRAMs. The controller has three internal ports allowing the DMA controller, the NP and the PP to access SDRAM via separate internal buses. The controller features independent write data and address buffering on each port (e.g., 16 word data buffer on each port (DMA, NP and PP ports); 1 address buffer per port); intelligent arbitration between the three ports where the arbitration scheme dynamically adjusts to the load conditions and also guarantees maximum latency requirements at each port; and advanced SDRAM interleaving where the SDRAM controller re-orders memory cycles to optimize data transfer. It does this by automatically interleaving banks of memory with in the SDRAM devices. The overhead of preparing one bank is hidden during data movement to the other. This process is entirely transparent to the user. Other features include data coherency guarantee where the controller guarantees data coherency between ports (e.g., data in a write buffer on one port can be accessed by a read from another port) and support for memory devices sizes of 64 Mb, 128 Mb and 256 Mb, each of which can be 8, 16 or 32 bits wide, the maximum memory that can be connected is 4×256 Mb (128 MB). Generally, access to the external SDRAM is 32-bits wide. Another feature includes a power down mode where a low power mode drastically reduces the power consumed by external SDRAM devices.

Figure 12:
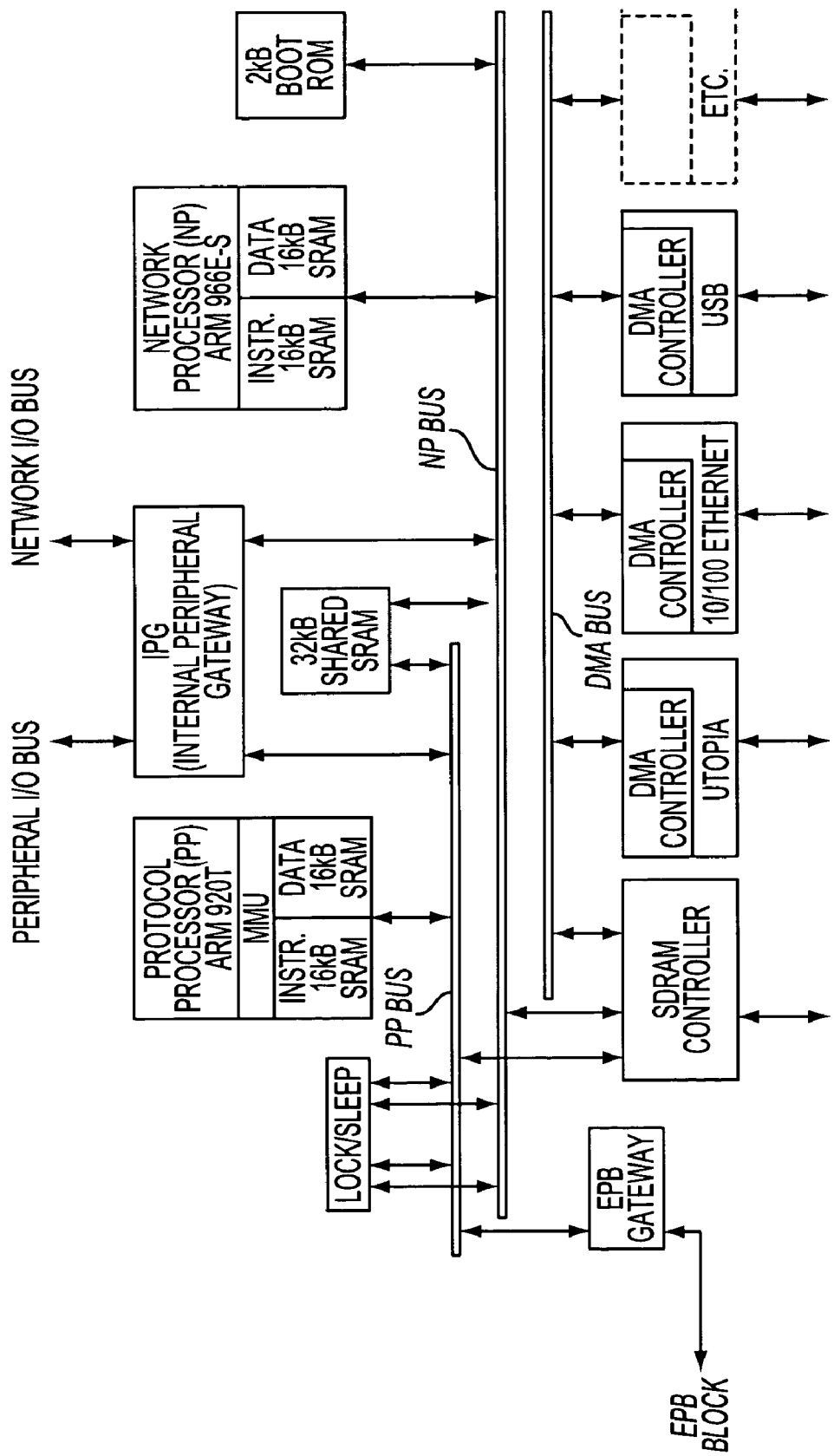
FIG. 12 is a schematic diagram of a hardware architecture in which the inventive aspects of the present invention may be incorporated.

FIG. 12 is a schematic diagram of a hardware architecture in which the inventive aspects of the present invention may be incorporated. In particular, FIG. 12 illustrates a core system including processors and DMAs. A principle use of the DMA system is for the NP to transfer data packets and cells between SDRAM buffers and network ports. The DMA system may include a DMA engine within each of the high performance I/O blocks and a dedicated DMA bus linking these engines to the SDRAM controller. This enables the NP to interleave operations efficiently on different devices without being stalled by SDRAM accesses. The DMA channels carry out functions such as checksum calculation and byte alignment as the data is transferred. The PP may also make use of DMA channels, for example to access devices attached to the EFB.

Figure 13:
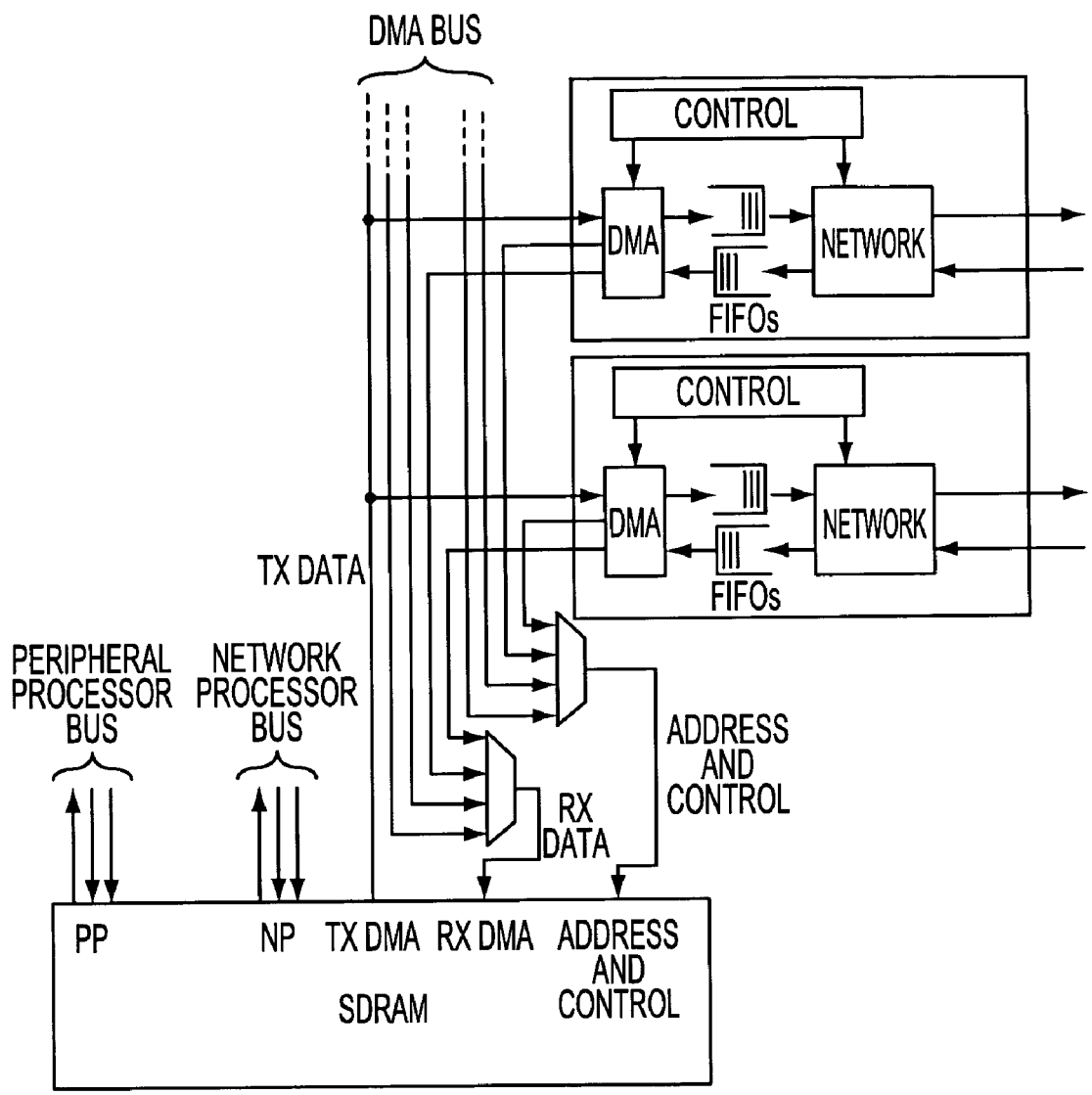
FIG. 13 is a schematic diagram of a hardware architecture in which the inventive aspects of the present invention may be incorporated.

FIG. 13 is a schematic diagram of a hardware architecture in which the inventive aspects of the present invention may be incorporated. In particular, FIG. 13 is a DMA block diagram. The DMA system reduces the reliance on NP when transferring data between high-speed I/O modules and the SDRAM memory. The system includes a DMA controller within each of the high-speed I/O modules, connecting directly to the Transmit and Receive FIFOs within the module; a dedicated DMA port on the SDRAM controller; and a dedicated high-speed 32-bit DMA bus, linking the DMA controllers to the SDRAM controller. DMA transfers between the network module FIFOs and the SDRAM take place in parallel with other NP operations; NP processing is required only at the start and end of the packet or cell. Each DMA controller is able to discard packets that do not need to be received. A single DMA transfer across the bus (e.g., a burst) is between one and 16 words. The 16 word limit prevents any device from "hogging" the DMA bus. Where larger DMA data transfers are required they are split into multiple 16-word bursts, automatically. Write performance is enhanced by buffering in the SDRAM controller. The addressable memory range of the DMA controllers is 256 MB, although the SDRAM controller limits the usable address range of 128 MB.

The DMA system illustrated in FIG. 13 includes two exemplary I/O blocks. Additional I/O blocks may be implemented. The control block without each of the I/O blocks is connected to the Network I/O. For clarify, these connections have been omitted from the diagram. The SDRAM controller shown in FIG. 13 provides write buffering on its input from the DMA bus, optimizing the performance of write operations.

Data transfers within the Helium 500 CP will normally take place under the control of the Network Processor (NP), responding to service requests provided through the Next Port mechanism. The Helium 500 CP allows other modes of operation; for example, DMA transfers could be driven by interrupts from the I/O ports. DMA transfers involve the inter-operation of the I/O block and the DMA block. Each I/O block which uses the DMA engine has two groups of registers, the I/O block-specific registers and the DMA registers. The I/O block-specific registers control data transfers (e.g., transmission and reception) between the I/O block and the external network and may be highly block specific. The DMA registers control DMA data transfer between the I/O block and the SDRAM and are essentially the same for each block, although not all of the DMA registers are provided in all I/O blocks. To set up a network data transfer (e.g., transmit or receive), I/O block-specific registers will be used to set up the transmit or receive operations and the DMA registers will be used to set up the data transfer between the I/O block and the SDRAM. Data is transferred directly between SDRAM and the FIFOs of the I/O block, under the control of the DMA engine and without any intervention from the NP. Burst transfers across the DMA bus are limited to a maximum of 16 words; if the requested transfer is longer than this it will be split into multiple 16-word bus transfers, and DMA bus arbitration will take place after each burst. With transmit operations, signaling within the DMA system ensures that data is only transferred across the DMA bus if the FIFO has space to receive it. The I/O block is responsible for detecting the recovering from data over- or under-run conditions, and may abort the DMA transfer (e.g., if it is unable to transmit data from the FIFO to free up space for the requested data transfer). When the entire data transfer has been completed the DMA block raises a service request to indicate the fact. The I/O block may then need to perform additional processing to complete the operation.

While the foregoing description includes many details and specificities, it is to be understood that these have been included for purposes of explanation only, and are not to be interpreted as limitations of the present invention. Many modifications to the embodiments described above can be made without departing from the spirit and scope of the invention.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. A method for allocating a shared resource among a plurality of devices, the method comprising the steps of:
    associating a bucket to each one of the plurality of devices wherein the plurality of devices share a shared resource;
    assigning a fill rate to each bucket where each bucket accrues a predetermined number of credits for each time period the associated device is stalled, wherein each fill rate is different, each fill rate indicating access priority assigned to the associated device;
    assigning a drain rate to each bucket where each bucket drains a predetermined number of credits for each time period the associated device is granted access to the shared resource, wherein each drain rate is different, each drain rate indicating access priority assigned to the associated device;
    determining a grant bucket based on a number of credits for each bucket at a specific time; and
    granting access to the shared resource to the device associated with the grant bucket.

2. The method of claim 1, wherein the shared resource comprises a memory bandwidth.

3. The method of claim 2, wherein memory bandwidth is associated with one or more of DRAM, SDRAM, SRAM and EPROM.

4. The method of claim 1, wherein the shared resource comprises a bus connected to at least one peripheral device including one or more of TDM, UART, USB, and PCI.

5. The method of claim 1, wherein the plurality of devices comprise processing units.

6. The method of claim 1, wherein the plurality of devices comprise at least a combination of a DMA controller, a network processor and a protocol processor.

7. The method of claim 1, further comprising the step of: determining a maximum latency when a bucket reaches a maximum number of credits.

8. The method of claim 7, further comprising the step of: granting immediate access to the shared resource to the device associated with bucket reaching the maximum number of credits when the maximum latency is determined.

9. The method of claim 1, further comprising the step of: dynamically adjusting one or more of the fill rate and drain rate associated with one or more buckets for load balancing one or more of the plurality of devices.

10. The method of claim 1, further comprising the step of: determining an amount of bandwidth each device has used.

11. The method of claim 10, further comprising the step of: charging an entity according to the amount of bandwidth used.

12. A system for allocating a shared resource among a plurality of devices, the system comprising:
    an association module for associating a bucket to each one of the plurality of devices wherein the plurality of devices share a shared resource;
    a fill rate module for assigning a fill rate to each bucket where each bucket accrues a predetermined number of credits for each time period the associated device is stalled, wherein each fill rate is different, each fill rate indicating access priority assigned to the associated device;
    a drain rate module for assigning a drain rate to each bucket where each bucket drains a predetermined number of credits for each time period the associated device is granted access to the shared resource, wherein each drain rate is different, each drain rate indicating access priority assigned to the associated device;
    a grant determination module for determining a grant bucket based on a number of credits for each bucket at a specific time; and
    a grant access module for granting access to the shared resource to the device associated with the grant bucket.

13. The system of claim 12, wherein the shared resource comprises a memory bandwidth.

14. The system of claim 13, wherein memory bandwidth is associated with one or more of DRAM, SDRAM, SRAM and EPROM.

15. The system of claim 12, wherein the shared resource comprises a bus connected to at least one peripheral device including one or more of TDM, UART, USB, and PCI.

16. The system of claim 12, wherein the plurality of devices comprise processing units.

17. The system of claim 12, wherein the plurality of devices comprise at least a combination of a DMA controller, a network processor and a protocol processor.

18. The system of claim 12, wherein a maximum latency is determined when a bucket reaches a maximum number of credits.

19. The system of claim 18, wherein immediate access to the shared resource is granted to the device associated with bucket reaching the maximum number of credits when the maximum latency is determined.

20. The system of claim 12, wherein one or more of the fill rate and drain rate associated with one or more buckets is dynamically adjusted for load balancing one or more of the plurality of devices.

21. The system of claim 12, wherein an amount of bandwidth each device has used is determined.

22. The system of claim 21, wherein an entity is charged according to the amount of bandwidth used.

23. A system comprising:
   means for associating a bucket to each one of the plurality of devices wherein the plurality of devices share a shared resource;
   means assigning a fill rate to each bucket where each bucket accrues a predetermined number of credits for each time period the associated device is stalled, wherein each fill rate is different, each fill rate indicating access priority assigned to the associated device;
   means for assigning a drain rate to each bucket where each bucket drains a predetermined number of credits for each time period the associated device is granted access to the shared resource, wherein each drain rate is different, each drain rate indicating access priority assigned to the associated device;
   means for determining a grant bucket based on a number of credits for each bucket at a specific time; and
   means for granting access to the shared resource to the device associated with the grant bucket.

24. The system of claim 23, further comprising:
   means for determining a maximum latency when a bucket reaches a maximum number of credits; and
   means for granting immediate access to the shared resource to the device associated with bucket reaching the maximum number of credits when the maximum latency is determined.

* * * * *

UNITED STATES PATENT AND TRADEMARK OFFICE
CERTIFICATE OF CORRECTION

PATENT NO. : 7,474,670 B2  
APPLICATION NO. : 10/614338  
DATED : January 6, 2009  
INVENTOR(S) : Farshid Nowshadi It is certified that error appears in the above-identified patent and that said Letters Patent is hereby corrected as shown below:

Column 13, Line 11:
    add "a" before "bucket"

Column 13, Line 22:
    delete "the" and replace with "a"

Column 14, Line 1:
    add "for" before "assigning"

Column 14, Line 20:
    add "a" before "bucket"

Signed and Sealed this  
Twentieth Day of September, 2011

David J. Kappos  
*Director of the United States Patent and Trademark Office*